UNITED STATES PATENT OFFICE.

WILLIAM F. WEBER, OF WASHINGTON, DISTRICT OF COLUMBIA.

AMBER VARNISH AND PROCESS OF MAKING SAME.

No. 840,812.     Specification of Letters Patent.     Patented Jan. 8, 1907.

Application filed December 24, 1900. Renewed April 26, 1906. Serial No. 313,834.

*To all whom it may concern:*

Be it known that I, WILLIAM F. WEBER, a citizen of the United States, residing at Washington, District of Columbia, have invented certain new and useful Improvements in Amber Varnishes and Processes of Making Same, of which the following is a description.

My invention relates to processes for the manufacture of oil varnishes—that is, varnishes which consist chiefly of linseed-oil or other fatty oil and gums in which the gum is dissolved in the oil by the application of heat; and my invention consists in the hereinafter-described process by which amber is dissolved in linseed-oil or other fatty oil by the application of heat to form with the addition of turpentine a varnish and in the product of such process as hereinafter described and claimed.

Heretofore it has been found practically impossible to dissolve amber in oil for the purpose of making varnish on account of the hardness of the amber and its resistance to heat.

In carrying out my invention I mix oil (preferably linseed-oil) with amber, preferably in small lumps or scraps. The proportion which I prefer is fifteen and one-half ounces or one pint of the oil to one pound of the amber; but these proportions may be varied from one-half pint of the oil to one pound of the amber to one and one-half pints of oil to the same amount of amber. The mixed oil and amber is placed in a kettle, preferably porcelain-lined, though this is not essential, and subjected to strong heat. I find that the amber begins to dissolve at a temperature of from 620° to 670° Fahrenheit. A heat substantially less than 600° will not cause the amber to dissolve.

As soon as the contents of the kettle are brought to the temperature above mentioned the particles of the amber tend to rise to the surface of the liquid, forming a scum on the surface. In practice I find that this scum begins to form at one side of the kettle and gradually spreads over the entire surface. The proportion of amber and oil being within the limits above described there will be sufficient of the softened particles of the amber to form a substantial coating or layer of scum over the entire surface of the mass, and it is important that this coating or layer of scum should not be broken, but should cover the entire surface until dissolved, as hereinafter described.

As soon as the surface of the boiling mass is completely covered with the scum the temperature of the mass rises to about 750° Fahrenheit and remains at that degree for about ten minutes, then rises to nearly or quite 800°. The layer of scum above described by confining the heat renders it possible to raise the temperature of the mass to this degree of heat without causing the oil to be boiled too much. If this temperature could be reached in an open kettle without the presence of this layer of scum, the oil would be reduced in volume by evaporation to such an extent that the complete dissolving of the amber could not be effected. The mass should be kept at this temperature for from one to two hours. I find that it usually requires about one hour and forty minutes to effect a complete dissolving of the amber. As the dissolving proceeds the scum, which is composed of particles of the gum in a more or less softened condition, gradually disappears. As soon as the scum disappears, showing that the amber is completely dissolved, I take the kettle with its contents from the fire or remove the flame from beneath it and permit the mass to cool to a temperature of about 100° Fahrenheit. When cooled to this degree, I add turpentine in the proportion of about seventy-three ounces or five pints of turpentine to the above-mentioned amount of oil and amber. I then apply heat to the mixture thus formed and stir until completely mixed. The mixture of amber and oil prior to the addition of the turpentine is a stiff tarry substance and if allowed to become cool forms a hard mass.

Varnish made by my process never becomes fat and will resist ammonia, muriatic acid, brine, salt, air, heat, cold, and dampness. In using varnish made by my process, it should not be rubbed under three days from its application. It will leave a better gloss from the brush than any other varnish of which I am aware. I find that this varnish improves by age.

It will be understood that while the proportions as above stated are the preferred proportions of oil and gum these proportions may be varied within considerable limits, as above indicated. By "fatty oils" I mean to include any fatty oil from which in combination with amber a varnish can be produced that can be made to dry. It should also be understood that I do not limit my invention to the use of the specific oil mentioned, and it should also be understood that within the term "amber" as above used is included other fossilized or semifossilized gums, usually known as "hard" gums and having a melting-point above the boiling-point of linseed-oil—such, for instance, as Zanzibar gum, Kauri gum, and hard Manila gum.

Having thus described my invention, what I claim, and desire to secure by Letters Patent, is—

1. The herein-described process of making varnish consisting in placing together a preparation of amber or other gum and oil, subjecting the same to a temperature in excess of 700° Fahrenheit in an open vessel, without stirring, cooling the mass, adding turpentine to thin the mixture and at the same time stirring and finally allowing the mixture to cool; substantially as described.

2. The herein-described process of dissolving amber in fatty oil, for the purpose of forming varnish, said process consisting in mixing the amber with the oil in the proportion of one pound of amber to not exceeding one and one-half pint of oil, heating the mixture in an open vessel to a temperature not less than 600° Fahrenheit, until a scum consisting of particles of softened amber, is formed over the entire surface, maintaining such coating of scum unbroken during the further heating of the mixture, whereby the mixture is brought to a temperature in excess of 700° Fahrenheit, and the particles of amber are gradually and completely dissolved in the oil; substantially as described.

3. The herein-described process of making varnish from amber, and fatty oil, said process consisting in mixing the amber with the oil in the proportion of one pound of amber to not exceeding one and one-half pint of oil, heating the mixture in an open vessel to a temperature not less than 600° Fahrenheit, until a scum consisting of particles of softened amber, is formed over the entire surface, maintaining such coating of scum unbroken during the further heating of the mixture, whereby the mixture is brought to a temperature in excess of 700° Fahrenheit, and the particles of amber are gradually and completely dissolved in the oil, cooling the mass thus formed, adding turpentine, heating and stirring until completely mixed; substantially as described.

4. The herein-described varnish consisting of a mixture of amber with linseed-oil and turpentine in the proportion of one pound of amber to not exceeding one and one-half pint of oil and sufficient turpentine to thin the mixture to proper consistency for use, the mixture being formed by first dissolving the amber in the oil in an open vessel at a temperature in excess of 700° Fahrenheit, cooling the mass so formed, adding the turpentine and heating and stirring the mixture; substantially as described.

In testimony whereof I affix my signature in presence of two witnesses.

WILLIAM F. WEBER.

Witnesses:
EDWARD E. HOLMAN,
A. P. GREELEY.